United States Patent
Marangoni

(10) Patent No.: US 10,653,162 B2
(45) Date of Patent: May 19, 2020

(54) OIL-IN-WATER STRUCTURED EMULSION COMPOSITION FOR USE AS A FAT SUBSTITUTE

(71) Applicant: Alejandro Marangoni, Guelph (CA)

(72) Inventor: Alejandro Marangoni, Guelph (CA)

(73) Assignee: Coavel, Inc., Ontario (CA)

( * ) Notice: Subject to any disclaimer, the term of this patent is extended or adjusted under 35 U.S.C. 154(b) by 0 days.

(21) Appl. No.: 14/427,900

(22) PCT Filed: Sep. 18, 2012

(86) PCT No.: PCT/CA2012/000857
§ 371 (c)(1),
(2) Date: Mar. 12, 2015

(87) PCT Pub. No.: WO2014/043778
PCT Pub. Date: Mar. 27, 2014

(65) Prior Publication Data
US 2016/0021905 A1   Jan. 28, 2016

(51) Int. Cl.
A23D 7/005 (2006.01)
A23D 7/01 (2006.01)
B01F 17/00 (2006.01)
A21D 13/16 (2017.01)

(52) U.S. Cl.
CPC ........... *A23D 7/0056* (2013.01); *A21D 13/16* (2017.01); *A23D 7/005* (2013.01); *A23D 7/01* (2013.01); *A23D 7/013* (2013.01); *B01F 17/0085* (2013.01)

(58) Field of Classification Search
CPC ...... A23D 7/005; A23D 7/0056; A23D 7/013; A23D 7/01; A21D 13/0058
USPC .......................................................... 426/602
See application file for complete search history.

(56) References Cited

U.S. PATENT DOCUMENTS

| | | | |
|---|---|---|---|
| 5,360,627 A * | 11/1994 | Desai | A21D 2/16 426/602 |
| 6,582,748 B1 | 6/2003 | Loh et al. | |
| 7,157,110 B2 | 1/2007 | Loh et al. | |
| 7,357,957 B2 | 4/2008 | Marangoni et al. | |
| 7,718,210 B2 | 5/2010 | Marangoni et al. | |
| 2007/0190186 A1 | 8/2007 | Loh et al. | |

FOREIGN PATENT DOCUMENTS

| | | |
|---|---|---|
| CA | 2245467 | 2/1999 |
| GB | 1163949 | 11/1966 |
| GB | 1146558 | 3/1969 |
| WO | 2014/043778 A1 | 3/2014 |

OTHER PUBLICATIONS

Marangoni et al. Encapsulation-stucturing of edible oil attenuates acute elevation of blood lipids and insulin in humans. Soft Matter, 2007, 3 183-187.*

* cited by examiner

*Primary Examiner* — Subbalakshmi Prakash
(74) *Attorney, Agent, or Firm* — Gowling WLG (Canada) LLP

(57) ABSTRACT

A product in the form of an oil in water emulsion is provided. The emulsion includes an oil phase which is an admixture of about 30-60% oil by weight, 0.01-15% wax by weight and a surfactant component, a combination of non-ionic and ionic surfactant in a ratio of at least about 10:1 to 30:1; and an aqueous phase comprising about 30-50% by weight of the emulsion. The product is useful as a fat substitute.

19 Claims, 11 Drawing Sheets

OIL-IN-WATER STRUCTURED EMULSION COMPOSITION FOR USE AS A FAT SUBSTITUTE

FIELD OF THE INVENTION

The present invention relates to a composition, and in particular, relates to a novel oil in water structured emulsion which is useful as a substitute for solid or semi-solid fat products.

BACKGROUND OF THE INVENTION

The negative effects of trans and saturated fats on human health has been a topic of intense discussion for several decades. Numerous studies have shown that excessive dietary intake of such fats, particularly trans fats which are known to lower HDL and increase LDL, can severely increase the risk of coronary heart disease, type 2 diabetes, obesity, stroke, metabolic syndrome, and other cholesterol-related maladies.

For these reasons, the American Heart Association recommends a maximum daily trans fat consumption of 2 grams, equivalent to 1% of daily caloric intake. On a global scale, governments have been pressured to pass legislation limiting, and in some cases completely restricting, the use of trans fats in commercial food products. In 2003, Denmark was the first to restrict the amount of trans fats in commercial items to 2% of total calories, followed by Switzerland in 2008.

Unfortunately, both trans and saturated fats are critical constituents of food systems. Trans and saturated fats provide both network structuring and solid-like functionalities to the food network. Eliminating these components from food products requires that they be substituted with other ingredients capable of providing similar solid-like behaviour and network structuring capabilities so that the quality and structure of the food is not compromised.

Finding such substitutes has proven to be challenging. U.S. Pat. Nos. 7,357,957 and 7,718,210 describe an oil-in-water structured emulsion for use as a fat in many bakery and spread applications. This product comprises a closely-packed ensemble of oil globules surrounded by crystalline walls composed of several emulsifier-coemulsifier bilayers interspersed with water. However, these teachings focus strictly on the use of liquid vegetable oils to achieve a product with reduced trans and saturated fat content. It would be desirable to develop a substituted fat product having rheological properties of a more solid fat product, for example, increased yield stress and elastic modulus.

SUMMARY OF THE INVENTION

A novel product has now been developed which is useful as a substitute for solid fat products.

Thus, in one aspect of the invention, a product is provided comprising an oil in water emulsion, said emulsion comprising:
i) an oil phase comprising an admixture of about 30-60% oil by weight of the emulsion, 0.01-15% wax by weight of the emulsion and surfactant, wherein the surfactant is a combination of non-ionic and ionic surfactant in a ratio of at least about 10:1 to 30:1; and
ii) an aqueous phase comprising about 30-50% by w/w of the emulsion.

In another aspect of the invention, a method of making a product comprising about 30-60% oil and 0.01-15% wax by weight is provided, comprising the steps of:
i) preparing an oil phase by admixing the oil, wax and surfactant, wherein the surfactant is a combination of non-ionic and ionic surfactant in a ratio of at least about 10:1 to 30:1 and heating the solution to a temperature above the melting point of the surfactant;
ii) preparing a heated aqueous phase;
iii) combining the aqueous phase and the oil phase and mixing to form an emulsion; and
iv) cooling the emulsion to form a solid comprising surfactant encapsulated oil layers in a continuous aqueous phase.

These and other aspects of the invention will become apparent in view of the detailed description and the following figures.

DETAILED DESCRIPTION OF THE INVENTION

Figure 1:
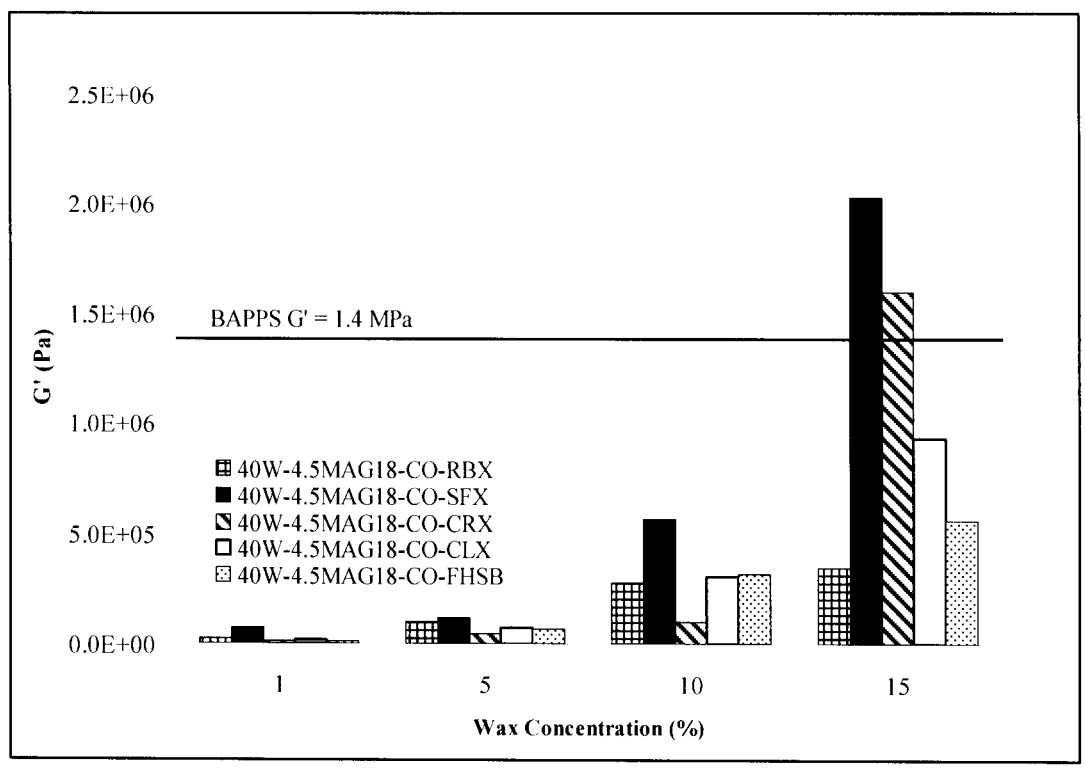
FIG. 1 graphically illustrates the effect of 10% (w/w) wax as an additive to an oil in water structured emulsion on SFC as compared with the SFC of optimal control lamination fat, BAPPS.

The present invention relates to a product comprising an oil in water structured emulsion. The emulsion comprises an aqueous phase, and an oil phase comprising an admixture based on the total emulsion of about 30-60% oil by weight, 0.01-15% wax by weight and surfactant, wherein the surfactant is a combination of non-ionic and ionic surfactant in a ratio of at least about 10:1 to 30:1.

The oil phase of the present product may include one or more of a variety of triacylglycerol oils, including, but not limited to, animal, vegetable, fish, yeast and algal triacylglycerol oils, for example, high oleic acid/low polyunsaturated fatty acid containing oils, for example, vegetable oils, e.g. high-oleic sunflower, high-oleic & high-stearic sunflower oil, high-oleic soybean, high-oleic canola, high-oleic safflower oil, avocado oil and olive oil, and medium and short-chain saturated triglycerides oils such as capryllic-capric triglyceride oils, Neobee oil and coconut oil, soybean oil, canola oil, sunflower oil, safflower oil, corn oil, flaxseed oil, almond oil, peanut oil, pecan oil, cottonseed oil, algal oil, palm oil, palm stearin, palm olein, palm kernel oil, hydrogenated palm kernel oil, hydrogenated palm stearin, fully hydrogenated soybean, canola or cottonseed oils, high stearic sunflower oil, enzymatically and chemically interesterified oils, butteroil, cocoa butter, and mixtures thereof. Preferred oils for use in the present product include soybean, canola, sunflower, palm oil and palm olein. Depending on the intended use of the present product, other oils may also be suitable for inclusion in the product such as cosmetic oils, e.g. isotridecyl isononanate or caprylic-capric triglyceride oil.

The wax component of the present food product may include any edible agent which functions to provide structure to the emulsion, for example, to increase stress yield and elastic modulus, of the emulsion. Suitable structuring agents include any wax, including, for example, but not limited to, edible waxes. Examples of suitable waxes include, but are not limited to, rice bran wax, carnauba wax, candelilla wax, sunflower wax, jojoba oil wax, corn oil wax, sugarcane wax, ouricury wax, retamo wax, paraffin wax and polyethylene wax. As one of skill in the art will appreciate, the selection of the wax will depend on the intended utility of the final product. For use in a food product, suitable waxes and suitable amounts thereof will be selected. For other utilities, alternate waxes may be utilized. The present food product generally includes about 0.01-15% by weight of the selected wax, preferably about 0.5-10% by weight of wax, and more preferably about 2-10% by weight wax.

The surfactant component of the present product includes a non-ionic surfactant in combination with an ionic co-surfactant. Preferably, the non-ionic surfactant is selected from monoglycerides, diglycerides, poly-glycerol esters, phospholipids and mixtures thereof. Non-limiting examples include glyceryl monobehenate (GMB), glyceryl monstearate (GMS), glyceryl monpalmitate (GMP), glycerlyl monomyristate, glyceryl monolaurate, glyceryl monocaprate, and mixtures thereof, for example, mixtures of GMS and GMP, mixtures of GMB and GMS, mixtures of GMB and GMP, and mixtures of GMS, GMP and GMB. The final product typically comprises about 3% to 6% w/w of non-ionic surfactant.

The surfactant component also includes an ionic co-surfactant. Examples of ionic surfactants that are suitable for use in the present product include cationic phospholipids, cationic non-fatty carboxylic acid esters, anionic lactylated fatty acid salts, anionic phospholipids, anionic non-fatty carboxylic esters, fatty acids (especially naturally occurring free fatty acids) and fatty acid metal salts. Specific ionic surfactants include stearic acid and its sodium salt, sodium stearoyl lactylate (SSL), palmitic acid, phosphatidic acid, lyso-phosphatidic acid and diacyl tartaric acid ester of monoglyceride (DATEM). As one of skill in the art will appreciate, if residual ionic surfactant is present in the non-ionic surfactant used, additional ionic surfactant may not be required. The surfactant component will generally comprise a non-ionic to ionic surfactant ratio of about 10:1 to 30:1, and preferably a ratio of about 20:1.

The aqueous phase of the present product may comprise any suitable aqueous solution, e.g. water, juice, water-based syrup, etc. Generally, the aqueous phase comprises water, preferably of low-ionic strength, such as deionized or distilled water, that may be buffered or not. The water may also include colourings, flavorings or other additives, such as stabilizers or sugars, depending on the use of the product and the desired characteristics thereof. The amount of the aqueous solution used in the present product is about 30-50% by wt, and preferably an amount of about 35-40% by wt.

The present product may also include additives that function to enhance one or more properties of the product. For example, sugars such as sucrose, maltose, glucose, fructose, dextrins, maltodextrins, cyclodextrins, as well as corn syrup, high fructose corn syrup, starch (amylose, amylopectin) and modified starches (starch derivatives), dextran, cellulose (microcrystalline and amorphous), methylcellulose, hydroxypropylcellulose, xanthan gum, agarose, galactomannans (guar gum, locust bean gum), polysaccharides, proteins, vitamins, minerals, salt, natural or artificial flavourings and colorants may be added. Such water soluble or water-binding components may be added to the aqueous phase in an amount suitable to achieve the desired effect without adverse effect on the rheological properties of the product. For example, in one embodiment, sugar in an amount of at least about 5% w/w of the total emulsion is added. In another embodiment, about 0.1% to 3% w/w of the total emulsion, preferably about 2% w/w of a 1:1 mixture of lambda-carregeenan-guar gum is added.

Components that function to increase the shelf life of the product may also be added thereto. For example, antioxidants such as butylated hydroxytoluene (BHT), butylated hydroxyanisole (BHA), propyl gallate (PG), tertiary butyl hydroquinone (TBHQ), tocopherols, rosemary extract and cocoa polyphenols may be used. Preservatives may also be added, including but not limited to, potassium sorbate to limit fungal growth. Such components are added to the oil phase in amounts conventionally used, as one of skill in the art would appreciate. For example, antioxidants are typically added in amount in the range of 0.05-0.2% of the total emulsion, while preservatives are typically added in an amount of up to about 0.1% of the total emulsion.

In one embodiment, a formulation of the present product comprises in the oil phase about 45-60% oil by weight, 3-6% by weight non-ionic surfactant, 0.1-0.4% by weight ionic surfactant and 0.5-7.5% by weight wax, and about 35-50% by weight water. In another formulation, the product comprises about 45-55% oil by weight, 4-6% by weight non-ionic surfactant, 0.2-0.4% by weight ionic surfactant and 5-7.5% by weight wax, and about 35-40% by weight water.

A process for preparing the present product is also provided. At the outset, the oil phase is prepared by admixing the selected oil in an amount of about 30-60% oil by weight of the emulsion, the selected wax in an amount of about 5-15% by weight of the emulsion, the surfactant component, including both the non-ionic and ionic surfactants, and any additives, e.g. antioxidant or preservative. The oil phase is then heated to a temperature above the melting point of the non-ionic surfactant, but below the temperature at which the non-ionic surfactant transitions from the lamellar to cubic or hexagonal II phase in water. This temperature will vary depending on the non-ionic surfactant used, but will generally be about 5-10 degrees above the melting point of the surfactant. For an 18-carbon-rich saturated monoglyceride, the preferred temperature is about 74° C.

The aqueous phase is heated to about the same temperature as the oil phase. Additives to be added to the aqueous phase, e.g. water-binding additives, may be added before, after or during heating.

The heated oil and aqueous phases are then combined, by adding the oil phase to the aqueous phase or by adding the aqueous phase to the oil phase. Once combined, the oil and aqueous phases are gently mixed for a sufficient period of time to form a visco-elastic oil in water mixture in which the surfactant is in a lamellar liquid crystalline phase. Following mixing, the mixture is cooled to form a structured solid-like emulsion material, which maintains the lamellar crystalline structure, suitable for use in foods.

The product of the present invention comprises unique structural characteristics. In particular, during the cooling phase, the surfactant component crystallizes, encapsulating the oil layers, to yield a solid cellular matrix within a continuous aqueous phase. The wax component also crystallizes and provides additional strength to the product, i.e. increased elastic modulus and yield stress, in comparison to the corresponding product that does not include such a structuring agent. In particular, the present product exhibits an elastic modulus of at least about $1 \times 10^5$ Pa, preferably at least about $5 \times 10^5$ Pa and more preferably at least about $1 \times 10^6$ Pa, and yield stress of at least about 700 Pa. These properties of the present product render it suitable for use as a healthy low-fat substitute for solid fats such as lamination fats and the like.

As one of skill in the art will appreciate, the present product may have additional or alternate utilities, e.g. cosmetic utilities such as use in lotions or balms.

Embodiment of the invention are described in the following specific examples which are not to be construed as limiting.

EXAMPLE 1

Materials and Methods

Materials

Rice Bran Wax (RBX), Carnauba Wax (CRX), Candelilla Wax (CLX) and Sunflower Wax (SFX) were supplied by Koster Keunen Inc. Stratas Foods supplied the fully-hydrogenated soybean oil (FHSB), while the alphadim SBK 90 monoglyceride and sodium stearic lactylate (SSL) were provided by Caravan Ingredients. Additional monoglyceride samples, monobehenate and HP K-A were supplied by Palsgaard and Dimodan, respectively. Palm Oil was provided by Bunge, and guar gum and lambda-carrageenan by Danisco. Potassium sorbate was supplied by Sigma Aldrich.

Emulsion Preparation

Emulsions were prepared by combining all oil-phase ingredients (oil, saturated monoglyceride, sodium stearoyl lactylate (SSL), antioxidants, and any wax or fat additive) separately from the water-phase ingredients (water and, in certain cases, polysaccharides and/or mono, di, and oligosaccharides). Both phases were heated to above the melting point of the emulsifiers in the oil, but below the lamellar to cubic phase transition of the saturated monoglyceride in water (80° C.), namely 75° C., and stirred before adding the oil-phase to the water-phase, at which point an external shear was applied until the sample appeared homogenous. The emulsions were statically cooled at room temperature for 12 hours before being placed in a 5° C. fridge for storage.

The formulation of the emulsions varied with respect to monoglyceride type and concentration, as well as oil, water, and additive concentration, in order to determine the effect and limitations of each component of the system. Monoglyceride concentrations varied between 2-6% (w/w), water between 20-40% (w/w), wax additives between 1-15% (w/w), and oil between 50-77% (w/w). When used, guar gum and λ-carrageenan comprised a total of 0.5% (w/w) of the sample in a 1:1 ratio, while the potassium sorbate was present at 0.1% (w/w) concentrations.

To distinguish between samples, the following general nomenclature was used: #W-#MAGX-#O, where # denotes concentration, X denotes monoglyceride chain length, and W, MAG, and O represent water, monoglyceride, and oil, respectively. The oil type is denoted by a letter preceding O, such as S (soybean), C (canola), or P (palm). Other additives such as wax or hydrocolloids are expressed similarly following the oil-phase expression.

Methods of Analysis

The rheological characteristics of each formulation were evaluated. In particular, the elastic modulus (G') and yield stress for emulsion samples was determined using a TA Instrument AR2000 Controlled Stress Rheometer. These parameters were obtained at 20° C., 16° C., and 5° C., under controlled stress and constant 1 Hz frequency conditions using a 40 mm 2° steel cone and plate geometry. Results were obtained in triplicate.

Results

System Overview

The present emulsion is an oil in water emulsion stabilized by multiple hydrated saturated monoglyceride-cosurfactant (~19:1) bilayers. These bilayers are lamellar liquid crystalline bilayers that begin to form above the melting point of the saturated monoglyceride in oil of about 72° C. Upon cooling, they crystallize, thereby transitioning from a liquid crystalline L-alpha phase into an alpha-gel state, stabilized by the addition of a co-surfactant. During hydration of the monoglycerides and the subsequent formation of the bilayers, the introduction of oil and an external shear force cause the bilayers to encapsulate the oil droplets and begin stacking into a multilayer barrier, surrounded by a continuous water phase.

In the present study, the resulting oil in water emulsion was manipulated in order to achieve a product with rheological characteristic that more closely match those of a semi-solid product, such as a laminating fat, e.g. elastic and film-forming properties (elastic modulus (G')), as well as the ability to withstand high pressure and stress (yield stress). More specifically, water content, oil type and content, monoglyceride chain length, and surfactant charge were evaluated as distinct parameters contributing to the rheological behaviour and mechanical performance of the emulsion.

With no modifications, this system has been shown to work very well as a trans-fat free all-purpose shortening substitute for bakery products ranging from cookies, muffins, and cakes, and is commercially marketed as Coasun©. Modifying this system to behave as a laminating fat would allow its use in products such as danishes and croissants, which can contain up to 70% of trans and saturated fats (as a percent of total fat). Using Coasun© as a shortening alternative would significantly reduce not only caloric content, but more importantly, that of trans and saturated fats, thereby creating a healthier pastry product.

Results

Bunge Anhydrous Puff Pastry Shortening (BAPPS) was the commercial laminating fat used as a comparative standard for all modified emulsions. At 20° C., BAPPS exhibited an elastic modulus of $1.4 \times 10^6 \pm 0.42 \times 10^6$ Pa, and a yield stress of $835 \pm 227$ Pa. The standard oil in water emulsion without any modification, herein referred to as Coasun©, displayed an elastic modulus of $8.42 \times 10^3 \pm 11.3$ Pa and an approximate yield stress of 112 Pa.

Preliminary SFC (solid fat content) measurements of BAPPS and Coasun© revealed that the commercial laminating fat had approximately three times more solid fat (FIG. 1) highlighting the need for a healthier, lower-fat substitute.

The Addition of Wax Esters for Oil-Phase Gelation

To increase the solid content of the oil in water system, structuring agents, namely, RBX, SFC, CLX, CRX, and FHSB were added to the oil phase. Structuring agents were added at concentrations of 1, 5, 10, 15% (w/w) to achieve gelling of the oil phase and create a solid-like emulsion component expected to enhance the mechanical strength of the system.

Increasing the wax content of the emulsions drastically increased the G' as shown in FIG. 1. However, at 15% (w/w) wax concentration, the emulsions acquired a waxy taste that would unfavourably permeate into the food product.

Figure 2:
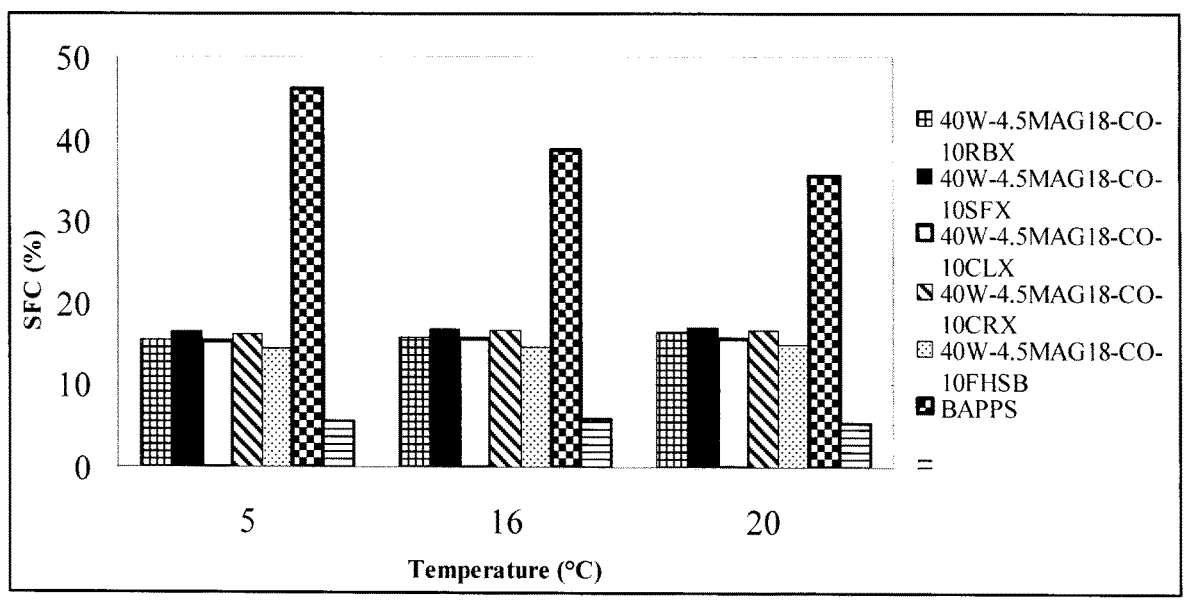
FIG. 2 graphically illustrates the effect of wax concentration (1-15% (w/w)) on elastic modulus, G' (Pa), of an oil in water structured emulsion under isothermal (20° C.) conditions.

Furthermore, this increase in G' was not directly associated with an increase in SFC. As shown in FIG. 2, the SFC of the oil in water emulsions was only tripled by addition of 10% structuring agent, ranging between 16-19%, and therefore still below the 37-45% SFC of BAPPS at equivalent temperatures.

Monoglyceride and Water Content

To avoid the uneconomical and distasteful addition of wax at concentrations greater than 10% (w/w), monoglyceride concentration was increased. Monoglyceride content was increased from 4.5 to 6% (w/w), which as expected, equivalently increased the SFC by 1-1.5%. More importantly, the presence of additional monoglyceride molecules resulted in thicker monoglyceride multilayers requiring greater hydration. For this reason the effect of water content, particularly in relation to monoglyceride concentration, was also evaluated.

Figure 3:
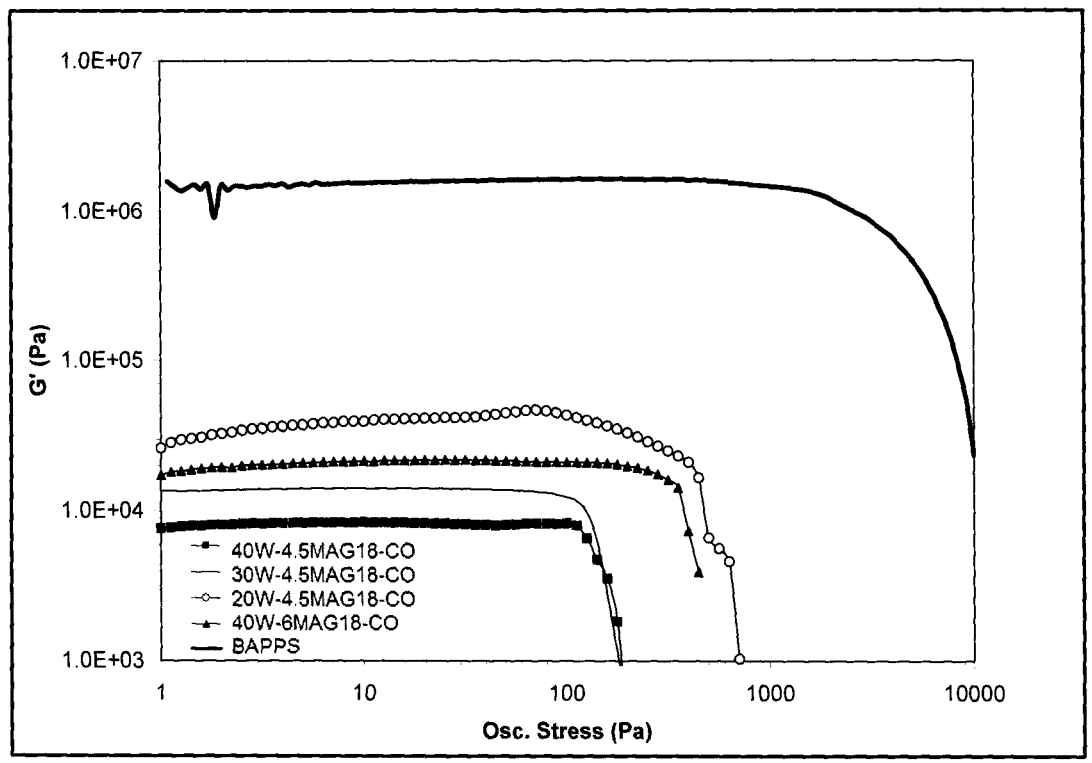
FIG. 3 graphically illustrates the effect of monoglyceride concentration, water content, and the resulting monoglyceride to water ratio, on G' and yield stress of a modified oil in water structured emulsion 20° C.

As summarized in Table 1, product having a monoglyceride concentration of 4.5% (w/w) and water content of 40%, Coasun© exhibited a G' of $8.42 \times 10^3 \pm 11.31$ Pa at an applied stress of 10 Pa. Dropping the monoglyceride to water ratio from 1:9 to just above 1:6 by adjusting the water concentration to 30% produced a 170% increase in elastic modulus, allowing it to reach $1.42 \times 10^4 \pm 2.15 \times 10^3$ Pa at the same applied stress. At the same monoglyceride to water ratio of 1:6, this time achieved by increasing the monoglyceride concentration to 6%(w/w) and maintaining a 40%(w/w) water content, the G' was further increased to $2.14 \times 10^4 \pm 4.96 \times 10^3$ Pa, a 250% increase compared to Coasun©. Finally, by dropping both monoglyceride and water concentration to 4% and 20%, respectively, to produce a 1:5 ratio, the G' was further increased by 460% to $3.93 \times 10^4 \pm 1.82 \times 10^4$ Pa. However, this sample appeared slightly yellow in colour and began inverting when left at room temperature for 24 hours, indicating instability. Only the sample containing 6% (w/w) monoglyceride experienced a significant yield stress extension of from 112 Pa to 281 Pa (FIG. 3).

TABLE 1

The effect of monoglyceride (MAG) to water ratios on G' (Pa) at an applied stress of 10 Pa and yield stress (Pa).

| Sample | Coasun © | Coasun 30 | Coasun 6 | Coasun 20 |
| --- | --- | --- | --- | --- |
| MAG:Water | 4.5 | 4.5 | 6 | 4 |
| % MAG (w/w) | 1:8.9 | 1:6.7 | 1:6.7 | 1:5 |
| G' (Pa) | $8.42 \times 10^3 \pm 11.3$ | $1.42 \times 10^4 \pm 2.1 \times 10^3$ | $2.14 \times 10^4 \pm 4.9 \times 10^3$ | $3.93 \times 10^4 \pm 1.8 \times 10^4$ |
| Yield Stress (Pa) | 112 | 100 | 281 | 112 |

The results suggest that the overall performance of the system is highly sensitive not only to the hydration of the monoglyceride multilayers, but also to the thickness of these multilayers. Greater monoglyceride concentrations result in a thicker multilayer system containing greater volumes of water. As a result, the radius of the oil droplets is increased and there is less free water in the continuous phase, decreasing the separation distance between encapsulated oil droplets.

The minimum monoglyceride concentration required to produce a stable emulsion was determined to be 3% (w/w). To ensure proper hydration and sufficient oil-droplet encapsulation, it was determined that the water content be at least about 30% and definitely no less than 25%. Under these conditions, the oil content must increase to compensate for the reduced water and monoglyceride concentrations. If the oil droplets cannot be sufficiently encapsulated by the monoglyceride molecules, then the emulsion may begin to leak oil as it attempts to invert from an o/w to w/o emulsion.

Hydrocolloids

To further investigate the contribution of the water phase composition to the overall mechanical properties of the material, and to aid in the reduction of water condensation within the product, hydrocolloids were added for their known contributions to viscosity and elasticity. Xanthan gum, guar gum, and a synergistic 1:1 (w/w) mix of guar gum and $\lambda$-carrageenan were added at 0.5% (w/w) concentrations to the water phase. Samples were made with 5% (w/w) RBX in combination with the addition of guar gum and carrageenan. Water content was adjusted to 39.5% (w/w) to accommodate for the addition of hydrocolloids, and the monoglyceride content remained at 4.5% (w/w).

Figure 4:
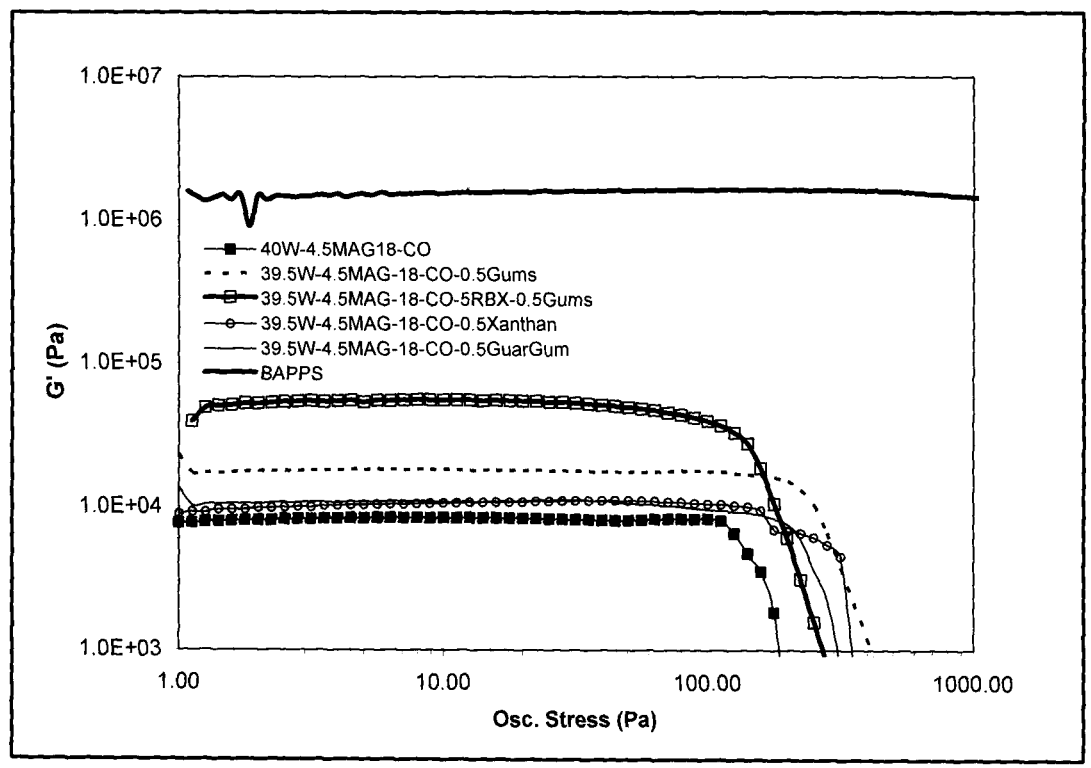
FIG. 4 graphically illustrates the effect of hydrocolloids added to the water phase of a modified oil in water structured emulsion on G' and yield stress of the emulsion at 20° C.

As expected, these modifications increased both the G' and yield stress of Coasun© (FIG. 4). Samples containing either xanthan or guar gum yielded a 128% increase in G', reaching values between $1.06 \times 10^4 \pm 3.24 \times 10^3$ and $1.08 \times 10^4 \pm 3.80 \times 10^3$ Pa, respectively, at an applied stress of 10 Pa. The combination of guar gum with $\lambda$-carrageenan proved to be more effective, as the G' increased by 215%, demonstrating the synergy between those two hydrocolloids. Finally, the sample containing the same hydrocolloid mixture and a 5% (w/w) wax concentration had the most drastic increase, raising the G' from $8.42 \times 10^3$ Pa to $5.54 \times 10^4 \pm 8.84 \times 10^3$ Pa with a small increase in yield stress ranging between 100 Pa to 200 Pa and a moderate effect on condensation.

Oil Phase Solid Fractions and Oil Type

To determine the contribution of the oil phase to the bulk-scale behaviour of the emulsion system, oil type was modified.

First, palm oil and palm kernel oil were used, each comprising the entire oil phase. Palm stearin (PS) was used in combination with canola oil at concentrations of 30, 50, and 70% (w/w) of the oil phase. All samples contained 40% (w/w) water, 4.5% (w/w) monoglyceride, and 55.275% (w/w) oil.

Figure 5:
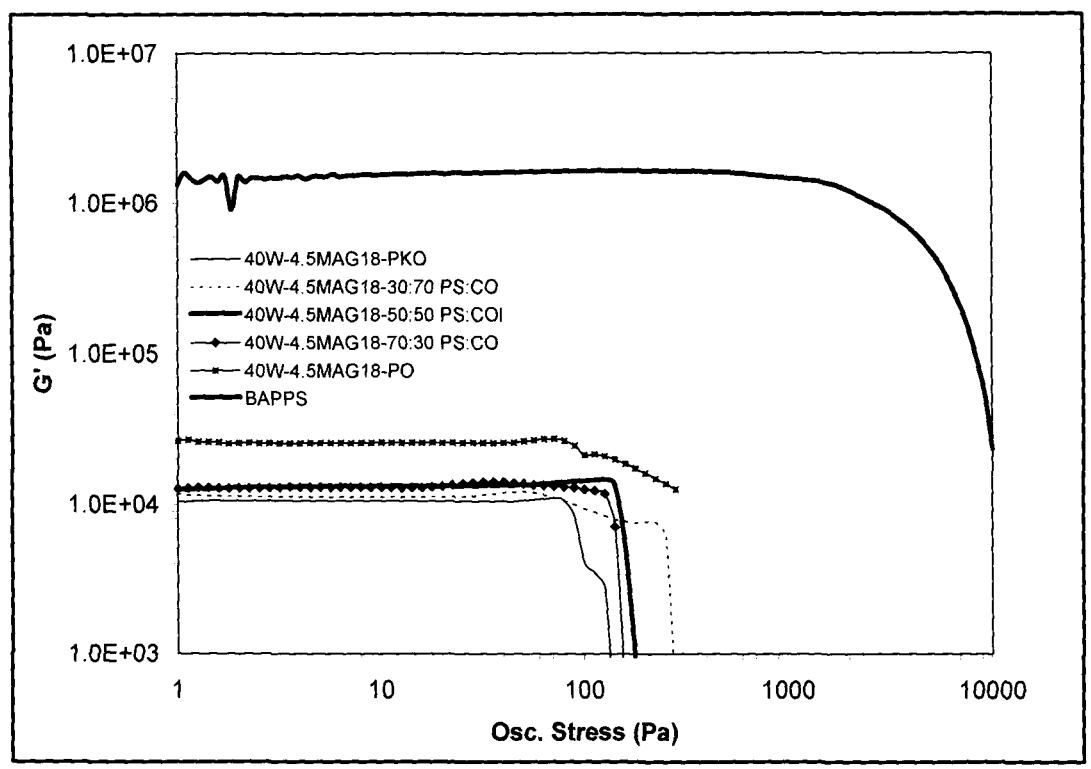
FIG. 5 graphically illustrates the effect of hardstock fats on G' and yield stress of a modified oil in water structured emulsion at 20° C.

Rheological assessments revealed that increasing the amount of palm stearin increased the G' and yield stress, suggesting that the solid-state behaviour of the additive contributed to the mechanical strength of the overall system, as seen with the addition of waxes. More specifically, this modification raised the G' between $1.12\times10^4\pm9.8\times10^3$ Pa for samples with the lowest amounts of PS to $1.30\times10^4\pm9.8\times10^3$ Pa for samples with the highest amounts of PS, and the yield stress to 125 Pa. Substituting canola oil with palm kernel oil had a similar effect on the G', raising it to $1.05\times10^4\pm2.3\times10^3$ Pa at an applied stress of 10 Pa, equivalent to a 125% increase. The use of palm oil comprising the entire oil phase resulted in a 300% increase in G' and a 25% extension of yield stress (FIG. 5).

Figure 6:
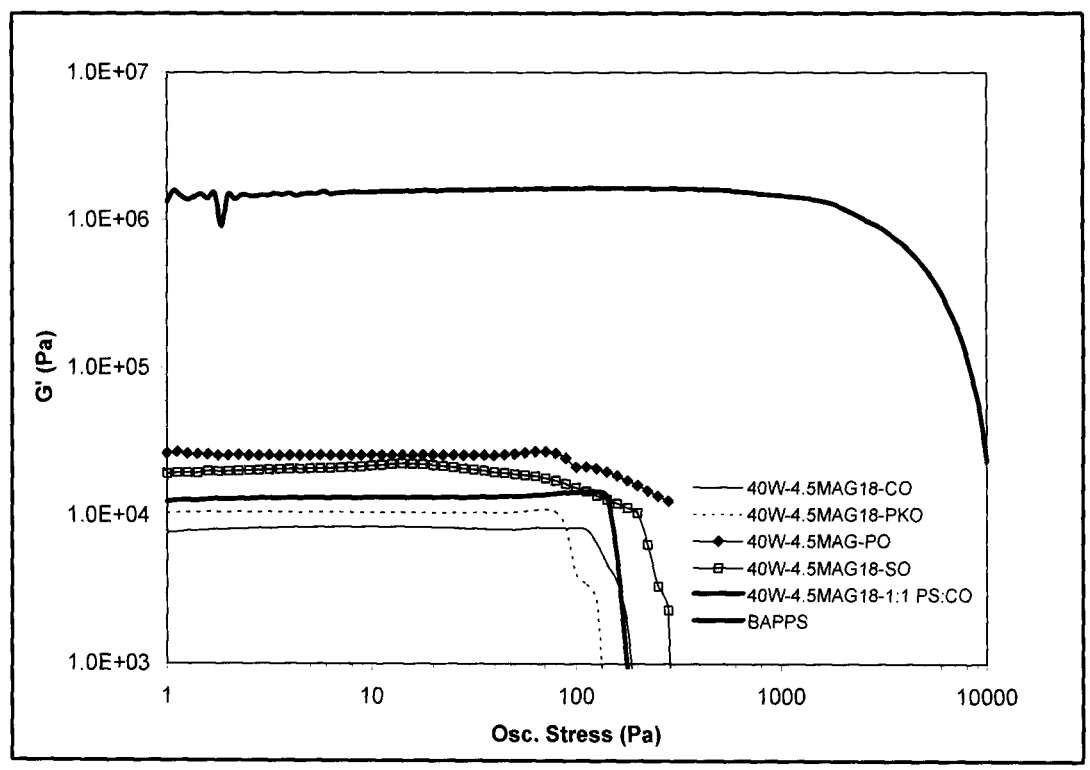
FIG. 6 graphically illustrates the effect of oil type on G' and yield stress of a modified oil in water structured emulsion at 20° C.

Soybean Oil was also evaluated as a candidate for the oil phase, and surprisingly had a greater impact on G' than solid-fat palm kernel oil and any combination of palm stearin with canola oil, as it increased the G' by almost 260%, reaching values of approximately $2.17\times10^4\pm8.2\times10^3$ Pa (FIG. 6).

Figure 7:
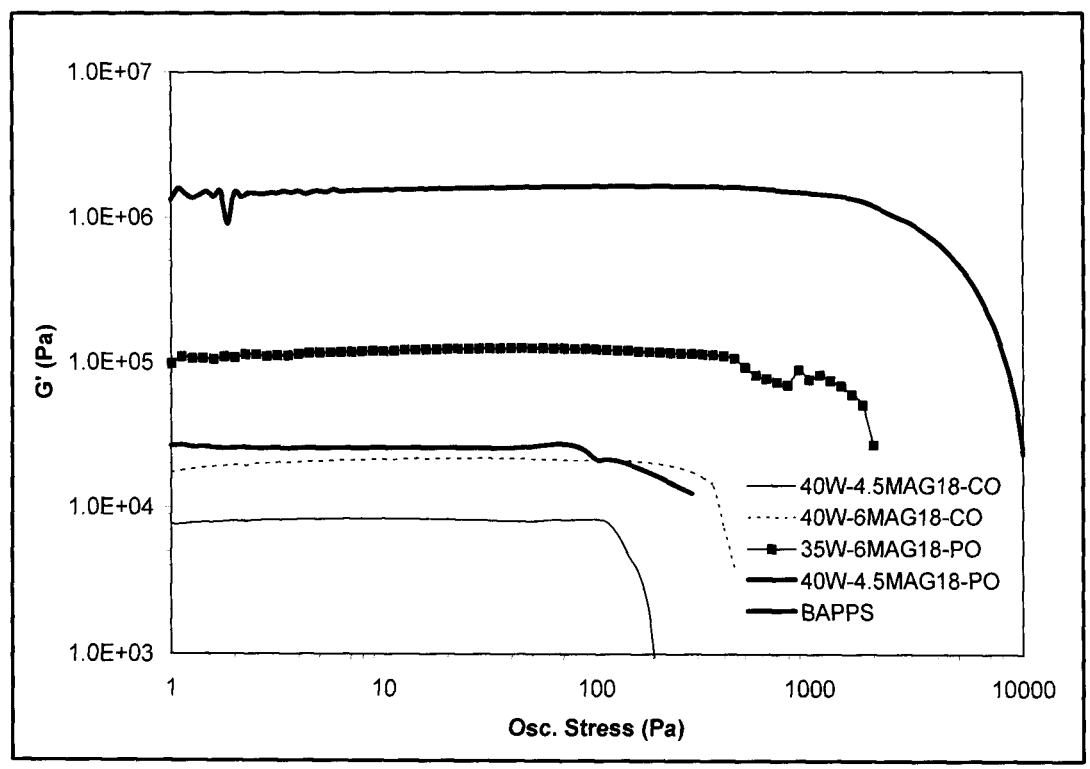
FIG. 7 graphically compares the effect of oil type (canola oil and palm oil) and monoglyceride concentration (4.5 and 6%) on G' and yield stress of a modified oil in water structured emulsion at 20° C.

Samples prepared with palm oil, 6% (w/w) monoglyceride and 35% (w/w) water resulted in G' values of $1.2\times10^5\pm3.5\times10^4$ Pa and a yield stress near 450 Pa (FIG. 7).

Monoglyceride Chain Length

The effect of monoglyceride chain length on the mechanical properties of the emulsion was also determined. The monoglyceride used in all previous samples, Alphadim 90 SBK, contained chains of 18 carbons, denoted as C-18. Samples were prepared with C-22 monoglyceride (monobehenate) prepared from high eurucic acid rapeseed oil, as well as a 50:50 C-16:C-18 monoglyceride (HPKA), obtained from hydrogenated palm oil. The samples contained 4.5% (w/w) monoglyceride, 40% (w/w) water, and 55.275% (w/w) canola oil.

Figure 8:
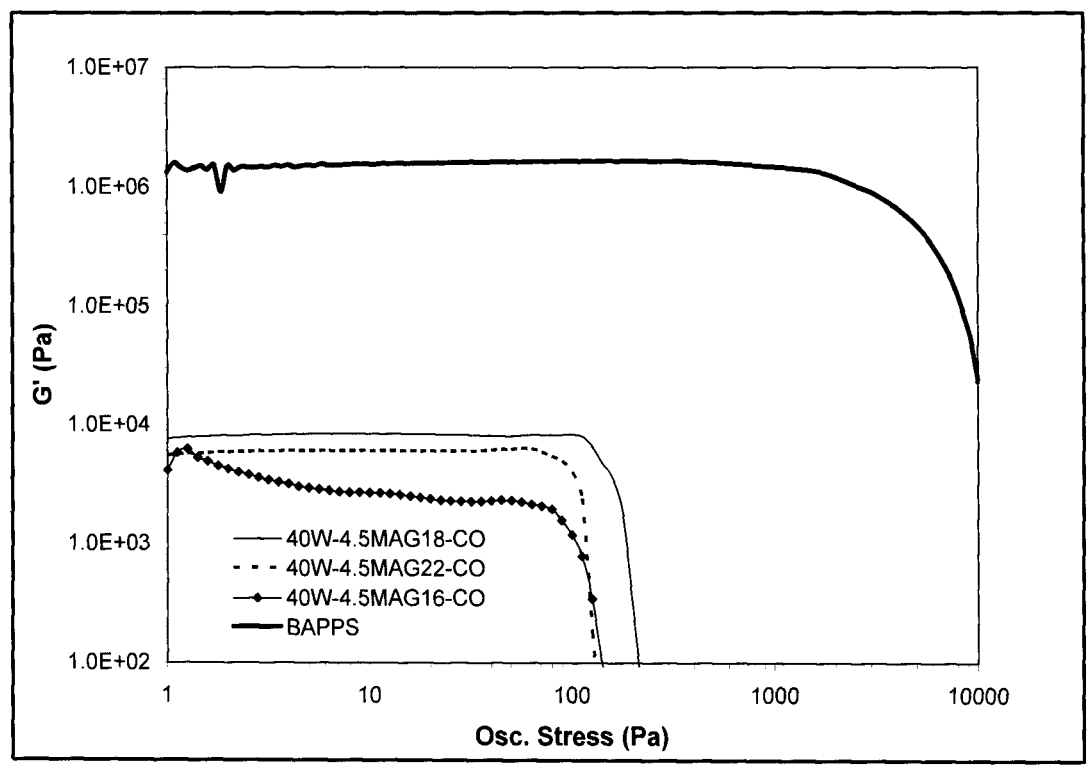
FIG. 8 graphically illustrates the effect of monoglyceride chain length on G' and yield stress of a modified oil in water structured emulsion at 20° C.
Figure 9:
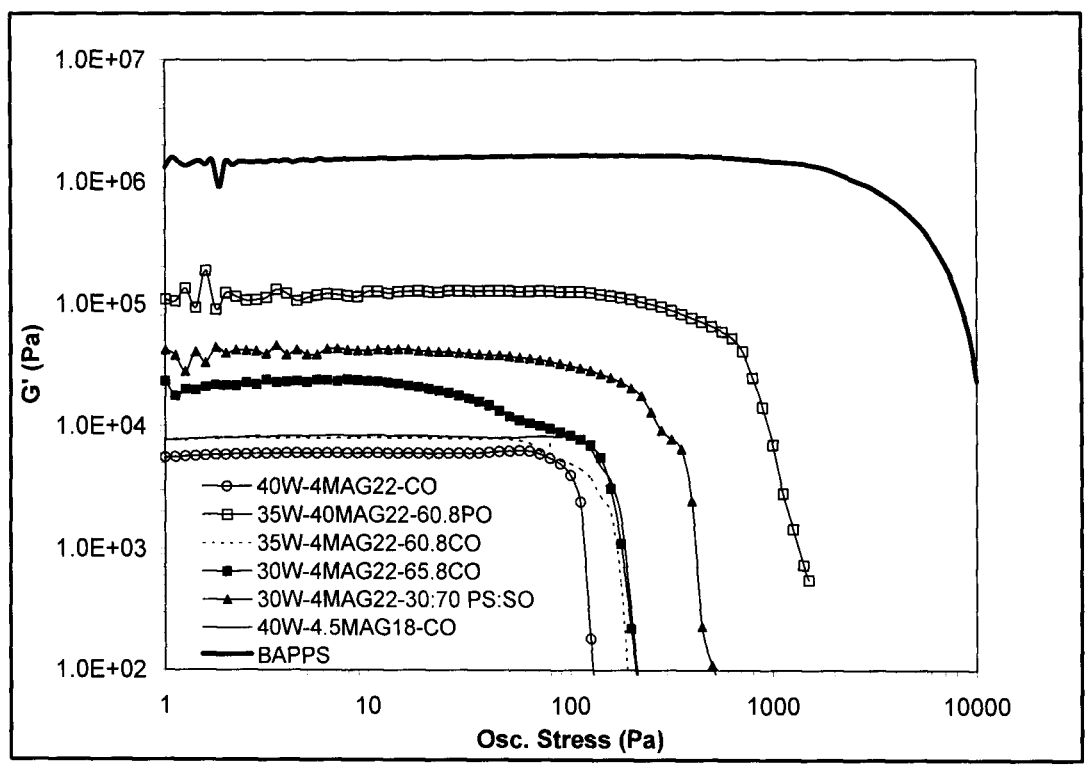
FIG. 9 graphically illustrates the effect of oil type and water content for behenic acid (22:0)-rich monoglyceride on G' and yield stress of a modified oil in water structured emulsion at 20° C.

Rheological evaluations revealed that the C-22 and 50% C-16 samples had a G' of $6.08\times10^4\pm8.1\times10^2$ and $2.68\times10^4\pm9.3\times10^2$ Pa, respectively, when prepared with canola oil (FIG. 8).

These alternative monoglycerides were further evaluated in compositions containing palm oil, soybean oil, and palm stearin. Samples containing 4% (w/w) C-22 monoglyceride, 35% (w/w) water and 60.8% (w/w) canola oil and palm oil were prepared. Additional samples containing 65.8% canola oil with 30% water, as well as 40% water and an oil phase composed of 30% palm stearin and 70% soybean oil, were also prepared.

Rheological evaluations revealed that palm oil as the oil-phase ingredient had a G' of $1.27\times10^5\pm7.8\times10^4$ Pa and a yield stress of 160 Pa. Using 65.8% canola oil or a 30:70 combination of palm stearin and canola oil produced respective G' values of $2.33\times10^4\pm2.3\times10^4$ Pa and $4.13\times10^4\pm1.8\times10^4$ Pa. Similar G' values were obtained using 50% C-16 monoglyceride at 4% (w/w).

EXAMPLE 2

Sample Laminating Fat Formulation

In view of the foregoing, a laminating fat product in accordance with the invention was made including the following amounts of surfactant, oil, wax and water to yield a nutritionally improved laminating fat:

TABLE 3

Formulation for lamination fat.

| | Laminate Fat |
|---|---|
| Monoglyceride | 6% alphadim 90 |
| Water | 35-40% |
| SSL | 0.3% |
| Oil | 51.08-46.08% canola oil or palm olein |
| Additives | 5-7.5% rice bran wax |
| | 0.1% potassium sorbate |

Figure 10:
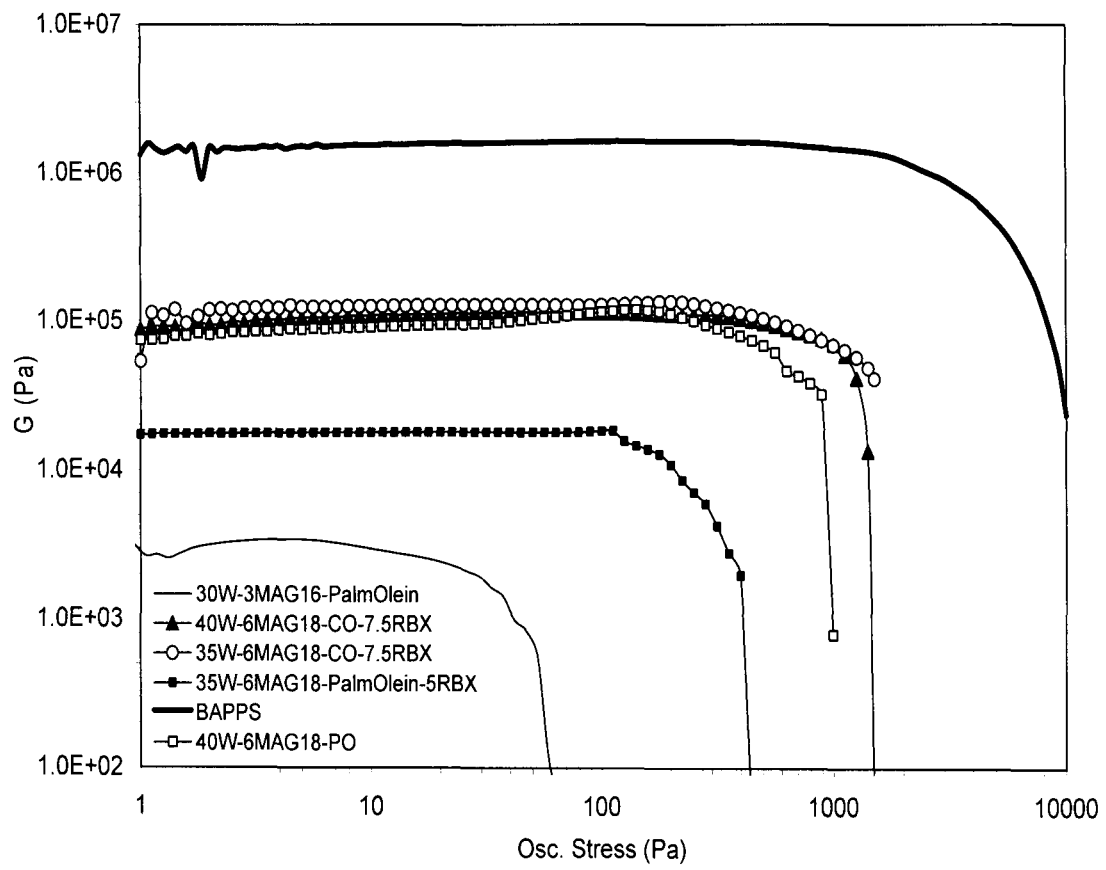
FIG. 10 graphically illustrates G' and yield stress at 20° C. of margarine substitutes and lamination fat products.
Figure 11:
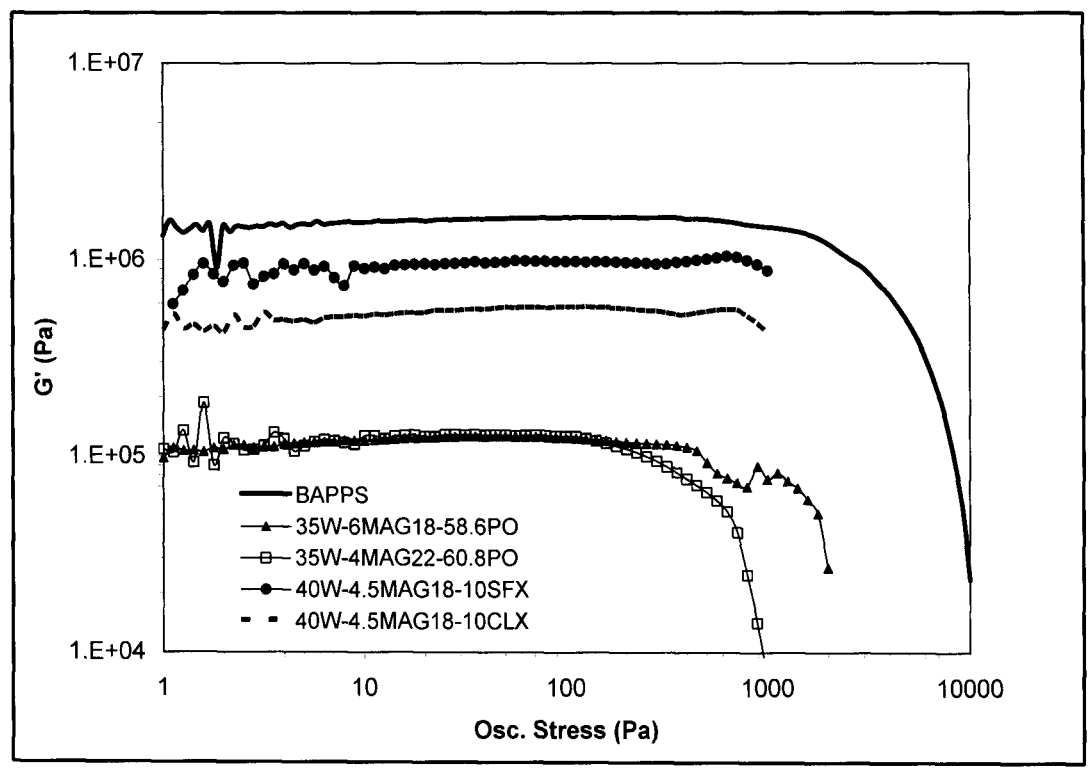
FIG. 11 graphically summarizes G' and yield stress of modified oil in water structured emulsions.

The formulation listed above was determined to function effectively as a substitute for a lamination fat. The formulation, for example, containing an oil content of 51%, provides a product having significantly improved nutritional properties compared to standard lamination fats. Modifying the wax content from 5% to 7.5% increases the G' by half an order of magnitude, as seen in FIG. 10. Furthermore, at equivalent wax concentrations of 7.5%, the sample containing 35% water had a slightly higher G' than the sample containing 40% water. This formulation, thus, provides a sodium-free laminating fat with fewer calories and less fat than commercially available products.

EXAMPLE 3

Use of Laminating Fat Formulation

A laminating fat product in accordance with the invention as set out below in Table 4 was used to replace a roll-in shortening in a recipe for making Danishes.

TABLE 4

| | Laminate Fat |
|---|---|
| Monoglyceride | 4% Alphadim |
| Water | 40% |
| SSL | 0.2% |
| Oil | 45.8% canola oil |
| Additives | 10% rice bran wax |

The Danish recipe used was as follows:

| Lbs | Ozs | Ingredients |
|---|---|---|
| 0 | 9 | Granulated sugar |
| 0 | 1 | Salt |
| 0 | 5 | Skim milk powder |
| 0 | ¼ | Cinnamon |
| 0 | 8 | Shortening |
| 1 | 2 | Eggs |
| 2 | 2 | Cold Water |
| 0 | 6 | Yeast |
| 3 | 8 | Bread Flour |
| 1 | 8 | Pastry Flour |
| 2 | 7 | Roll-in Danish shortening |
| 12 | 8¾ | Total Weight |

The Danishes were prepared as follows. The sugar, salt, skim milk powder, cinnamon, and shortening were blended for 2 minutes at medium to low speed using a hook or paddle. The eggs were added gradually on slow speed. The yeast was dissolved in water, added to the mix and blended for 1 minute. The bread flour and pastry flour were then added and blended for 1 minute on low speed. The sides of the bowl were scraped and mixing was continued for half minute on medium to low speed. The dough was placed on a paper lined sheet pan which was dusted with flour, covered and then allowed to rest for 30 minutes in the refrigerator. Following this rest, the dough was rolled into a rectangular shape, 30 cm×60 cm, and the roll-in shortening was spread over two-thirds of the dough. The uncovered dough was rolled over one third of the fat covered dough, the flour brushed off the dough and the remaining fat covered dough rolled over the rest of the dough. The dough was then rolled, folded and rested in the traditional manner. Following the final resting period, the dough was rolled into a rectangle and cut crosswise to yield a rectangular shape of 48"×18". The rectangle was rolled into tight roll and cut into 2½ oz pieces. These pieces were twisted and formed into a round danish shape, topped with fruit and baked at 400 degrees F.

Danishes made using this recipe and the fat product identified above were comparable to Danishes made using a commercial lamination fat.

EXAMPLE 4

Use of Laminating Fat Formulation

Croissants were also made using the lamination fat product identified in Example 3 as the roll-in shortening. The croissants were made using the following recipe:

| Lbs | Ozs | Ingredients | Kg | g |
|---|---|---|---|---|
| 3 | 5 | Bread Flour | 1 | 500 |
| 0 | 1 | Salt | 0 | 030 |
| 0 | 2 | Granulated Sugar | 0 | 050 |
| 2 | 3 | Cold Milk | 1 | 000 |
| 0 | 3 | Yeast | 0 | 085 |
| 0 | 7 | Butter | 0 | 200 |
| 0 | 14 | Croissant roll-in shortening | 0 | 400 |

The croissants were prepared as follows. The first three ingredients were placed in a 30 qt. mixing bowl. The yeast was dissolved in cold milk, added to the ingredients in the mixing bowl and mixed with a dough hook for 2 minutes on low and 4 minutes on 2nd speed. The dough was placed on paper lined baking sheet, dusted with flour, spread out and placed in freezer for 30 minutes. Butter and roll-in shortening were blended together and rolled into the dough. The dough was then folded, rested and rolled in the conventional manner. When this process was completed, the croissants were formed and shaped. Croissants should weigh 55 g each. They were placed on paper lined baking sheet 4×6, egg wash applied twice on top of each and baked at 425° F.

Croissants made using this recipe and the fat product identified above were comparable to croissants made using a commercial lamination fat.

The invention claimed is:

1. An oil in water emulsion that functions as a laminating fat, said emulsion comprising:
  i) an oil phase comprising an admixture of about 45-60% oil and 0.5-7.5% wax by weight of the emulsion, and a surfactant component, wherein the surfactant component is a combination of non-ionic and ionic surfactant in a ratio of at least about 10:1 to 30:1, wherein the non-ionic surfactant comprises 3-6% by weight of the emulsion and the ionic surfactant comprises 0.1-0.4% by weight of the emulsion and the non-ionic surfactant comprises a monoglyceride and the ionic surfactant is selected from a fatty acid, fatty acid metal salt and anionic lactylated fatty acid salt; and
  ii) a continuous aqueous phase comprising about 25-50% by weight of the emulsion, wherein the oil phase of the emulsion forms a solid cellular matrix with crystallized wax within the continuous aqueous phase and the emulsion exhibits an elastic modulus of at least $1 \times 10^5$ Pa.

2. The emulsion of claim 1, wherein the oil is selected from the group consisting of high oleic acid/low polyunsaturated fatty acid containing oils, high-oleic sunflower, high-oleic & high-stearic sunflower oil, high-oleic soybean, high-oleic canola, high-oleic safflower oil, avocado oil, olive oil, medium and short-chain saturated triglycerides oils, caprylic-capric triglyceride oils, coconut oil, soybean oil, canola oil, sunflower oil, safflower oil, corn oil, flaxseed oil, almond oil, peanut oil, pecan oil, cottonseed oil, algal oil, palm oil, palm stearin, palm olein, palm kernel oil, hydrogenated palm kernel oil, hydrogenated palm stearin, fully hydrogenated soybean, cottonseed oils, high stearic sunflower oil, enzymatically and chemically inter-esterified oils, butteroil, cocoa butter and mixtures thereof.

3. The emulsion of claim 2, wherein the oil is selected from the group consisting of soybean, canola, sunflower, palm oil and palm olein.

4. The emulsion of claim 1, wherein the wax is selected from the group consisting of rice bran wax, carnauba wax, candelilia wax, sunflower wax, jojoba oil wax, corn oil wax, sugarcane wax, ouriculy wax and retamo wax.

5. The emulsion of claim 1, wherein the non-ionic surfactant is selected from the group consisting of glyceryl monobehenate (GMB), glyceryl monstearate (GMS), glyceryl monpalmitate (GMP), glycerlyl monomyristate, glyceryl monolaurate, glyceryl monocaprate, and mixtures thereof.

6. The emulsion of claim 1, wherein the ionic surfactant is selected from the group consisting of stearic acid, palmitic acid, a metal salt of stearic or palmitic acid and sodium stearoyl lactylate (SSL).

7. The emulsion of claim 1, wherein the ratio of non-ionic to ionic surfactant is about 20:1.

8. The emulsion of claim 1, comprising one or more additives selected from the group consisting of sugars such as sucrose, maltose, glucose, fructose, dextrins, maltodextrins, cyclodextrins, corn syrup, high fructose corn syrup, amylose, amylopectin, modified starches, dextran, cellulose, methylcellulose, hydroxypropylcellulose, xanthan gum, agarose, guar gum, locust bean gum, polysaccharides, proteins, vitamins, minerals, salt, natural flavourings, artificial flavourings, colorants, anti-oxidants and preservatives.

9. The emulsion of claim 1, having a yield stress of at least about 700 Pa.

10. The emulsion of claim 1, comprising about 35-50% by weight water.

11. The emulsion of claim 10, comprising in the oil phase about 45-55% oil by weight, 4-6% by weight non-ionic surfactant, 0.2-0.4% by weight ionic surfactant and 5-7.5% by weight wax, and about 35-40% by weight water.

12. A process for making an oil-in-water emulsion as defined in claim 1, comprising the steps of:
  i) preparing an oil phase by admixing the oil, wax and surfactant component, and heating the oil phase to a temperature above the melting point of the non-ionic surfactant;
  ii) preparing a heated aqueous phase;
  iii) combining the aqueous phase and the oil phase and mixing to form an emulsion in which the oil phase comprises 30-60% by wt of the emulsion, the wax comprises 0.5-7.5 by weight of the emulsion, the surfactant component is a combination of non-ionic and ionic surfactant in a ratio of at least about 10:1 to 30:1 and the non-ionic surfactant comprises a monoglyceride and the ionic surfactant is selected from a fatty acid, fatty acid metal salt and anionic lactylated fatty acid salt, the non-ionic surfactant component comprises 3-6% by weight of the emulsion and the ionic surfactant comprises 0.1-0.4% by weight of the emulsion, and the aqueous phase comprises about 25-50% by weight of the emulsion; and iv) cooling the emulsion to form a solid cellular matrix with crystallized wax in a continuous aqueous phase, wherein the emulsion exhibits an elastic modulus of at least $1 \times 10^5$ Pa.

13. The process of claim 12, wherein the oil phase is heated to a temperature which is about 5-10 degrees above the melting point of the non-ionic surfactant and below the temperature at which the non-ionic surfactant transitions from lamellar to cubic phase in water.

14. The process of claim 12, wherein the aqueous phase is heated to the same temperature as the oil phase.

15. The process of clam 12, wherein the oil is a triacylglycerol oil.

16. The process of claim 12, wherein the non-ionic surfactant is selected from the group consisting of glyceryl monobehenate (GMB), glyceryl monostearate (GMS), glyceryl monopalmitate (GMP), glyceryl monomyristate, glyceryl monolaurate, glycerylmonocapratemonoglycerides and mixtures thereof, and the ionic surfactant is selected from the group consisting of stearic acid, palmitic acid, a metal salt of stearic or palmitic acid and sodium stearoyl lactylate (SSL).

17. The process of claim 12, wherein the wax is selected from the group consisting of rice bran wax, carnauba wax, candelilla wax, sunflower wax, jojoba oil wax, corn oil wax, sugarcane wax, ouricury wax and retamo wax.

18. The emulsion of claim 1, wherein the non-ionic surfactant is glyceryl monostearate and the ionic surfactant is sodium stearoyl lactylate.

19. The process of claim 12, wherein the non-ionic surfactant is glyceryl monostearate and the ionic surfactant is sodium stearoyl lactylate.

* * * * *